Patented Dec. 22, 1925.

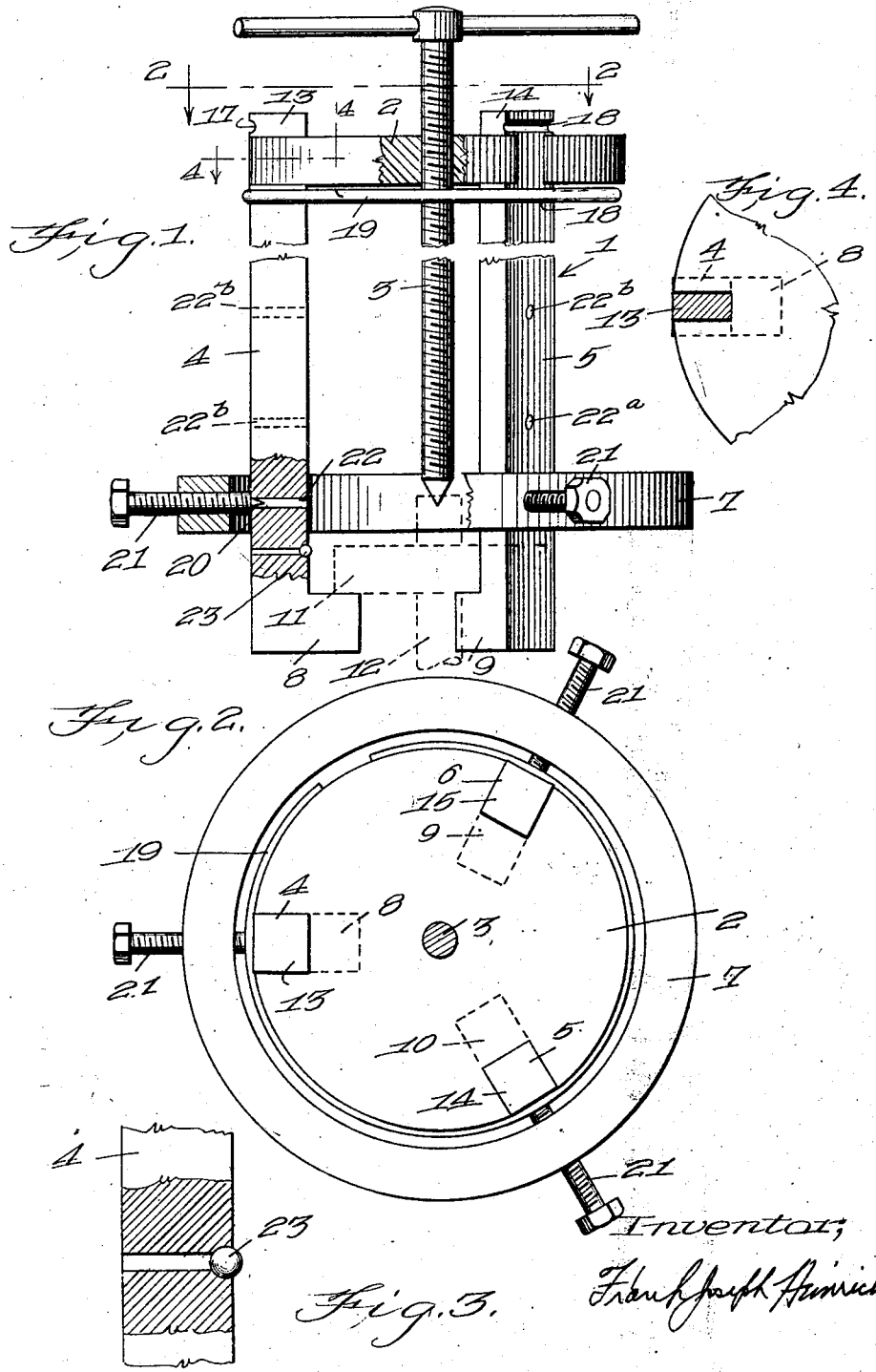

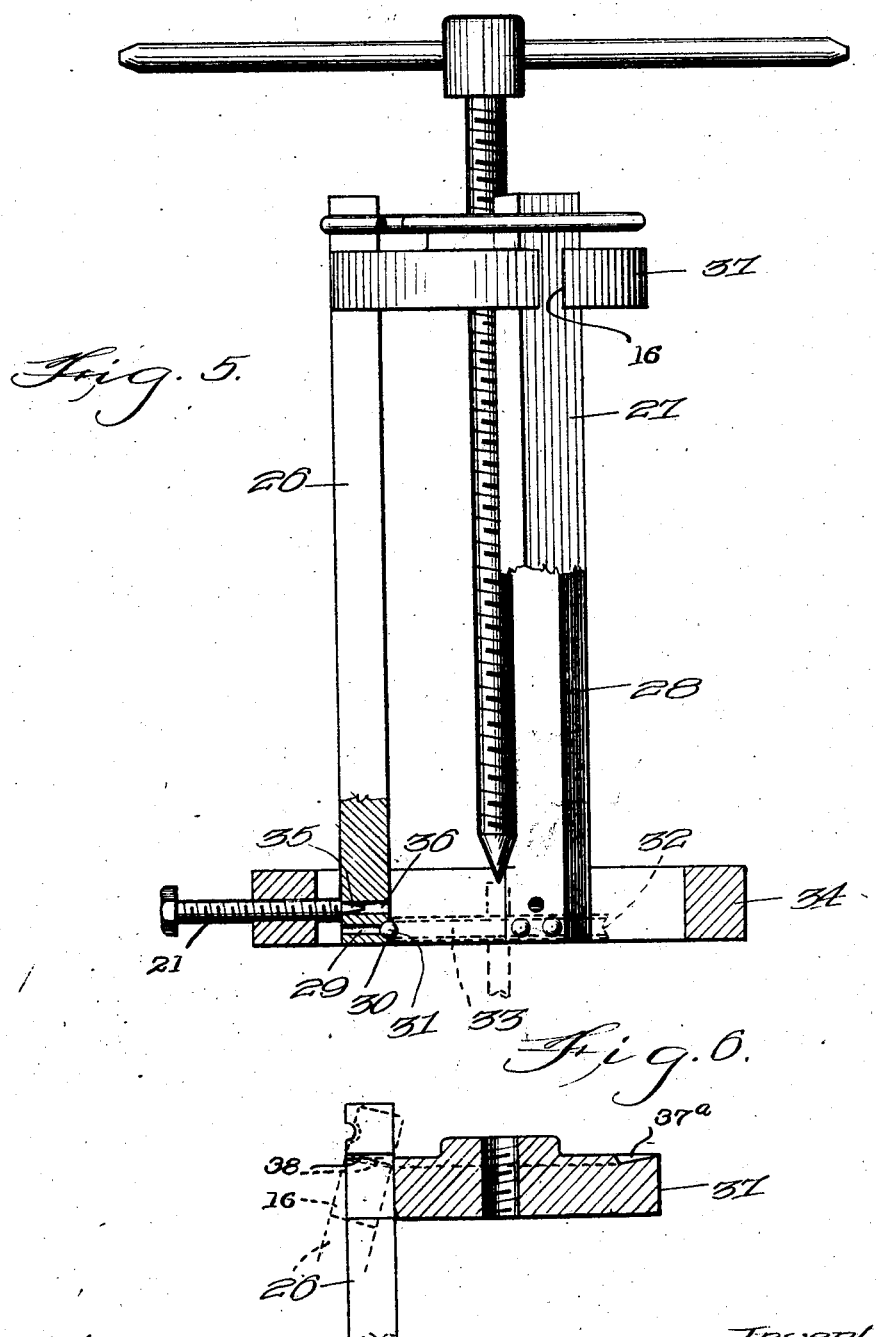

1,566,673

UNITED STATES PATENT OFFICE.

FRANK J. HEINRICH, OF YAKIMA, WASHINGTON.

GEAR AND PULLEY PULLER.

Application filed January 24, 1922. Serial No. 531,458.

*To all whom it may concern:*

Be it known that I, FRANK J. HEINRICH, a citizen of the United States, residing at Yakima, in the county of Yakima and State of Washington, have invented certain new and useful Improvements in Gear and Pulley Pullers, of which the following is a specification.

This invention relates to improvements in gear pullers and has for its object to provide a puller adapted to remove either a gear or a pulley from a shaft upon which it is mounted.

Another object of the invention is to provide a knock-down gear puller.

A still further object of the invention is to provide a gear puller having resilient means for holding the puller arms connected with a gear.

A still further object of the invention is to provide a pulley puller having means for adjustably connecting the same with the puller removed.

Another object of the invention is to provide a gear puller having a removable head and arms resiliently held to said head.

With the above and other objects in view, I have invented a device illustrated in the accompanying drawings of which, Figure 1 is an elevational view of my invention shown partly broken away, Figure 2 is a top plan view, the screw being cut away on line 2—2, Figure 3 is a fragmental sectional detail view, Figure 4 is a section on line 4—4 Figure 1, Figure 5 is an elevational view of a modified form of the invention and Figure 6 is a detail transverse sectional view of a head member.

Like reference characters indicate like parts throughout the following specifications and in the several views of drawings in which 1 indicates a pulley or gear puller which consists of a head 2, a screw 3, puller arms 4, 5 and 6, and a brace frame 7. Each of the arms 4, 5 and 6 have inturned right angular ends 8, 9 and 10 which are adapted to seat behind a pulley 11, shown dotted, when pulling the same from a shaft 12 shown dotted. The upper ends 13, 14 and 15 of the members 4, 5 and 6, are cut away on their inner surfaces to form recesses 16 into which the peripheral edge of the head 2 is adapted to seat. The said upper ends 13, 14 and 15, are provided with arcuate grooves 17 and 18, above and below the head 2 and in the outer surfaces of said arms 4, 5 and 6, to receive the open spring ring 19 which holds said arms to said head when the puller is set up for operation.

When using the device as a gear puller the frame 7 is not essential, the spring ring 19 in this case being placed in the grooves 18 inwardly of the head 2 in order to not only hold the arms 4, 5 and 6 to said head but to hold said arms in connection with the gear being pulled.

When the device is used as a groove pulley puller ring 19 may be seated in the grooves 17 and the frame 7 mounted around the arms 4, 5 and 6 in which case the reduced ends 20 of the screws 21 threaded through said ring frame 7 are projected into the bores 22 in said arms 4, 5 and 6, whereby said arms may be forced into close contact with the pulley being operated upon, the balls 23 seating in the groove of the pulley (not shown). The balls 23 are mounted in bores 24 in said arms into which are threaded screws 25 by means of which said balls may be forced out of said bores when mutilated in order that other balls may be readily replaced in the bores. Bores $22^a$ and $22^b$ are provided throughout the length of arms 4, 5 and 6, in order that the frame member 7 may be adjustably mounted around said arms.

The spring device for holding the arms 4, 5 and 6, connected with the head 2 permit of pivotal movement between said arms relative to said head in order that the device may readily be adjusted to gears of various sizes.

In Figure 5 I show a modification of the invention in which the arms 26 and 27 and 28 are provided with bores 29 having enlarged inner recesses 30 to receive the balls 31 which project approximately half way out of said recesses in order to seat into an annular channel 32 in the pulley 33 whereby said pulley may be gripped by said arms through the means of the ring 34 which seats around said arms and is held in position by the clamp screws 21, have reduced conical ends 35 operating in the bores 36 in said arms, said conical ends permit the arms to swing into and out of relation with said ends 35. The head 37 of the device has a concaved portion $37^a$ formed on its upper surface and concentric with its outer edge, and is adapted to receive the shoulders 38 of the recesses 16 of the arms, and to support the arms when the puller is used on gears of larger diameter than the head. A tool (not shown) may be projected through the bores 29 to hammer out the balls 31 when they become worn.

Having described my invention that which I claim is new and desire to secure by Letters Patent is:

1. A combined gear and pulley puller including a head, arms removably connected thereto, and means for holding said members removably connected, said means consisting of a resilient open ring.

2. A combined gear and pulley puller including a head, arms removably connected thereto, and means for holding said members removably connected, said means consisting of a resilient open ring, means whereby said ring may be mounted upon said arms inwardly or outwardly of said head.

3. A combined gear and pulley puller including a head, arms removably connected thereto, and means for holding said members removably connected, said means consisting of a resilient open ring, said arms having in-turned ends.

4. A combined gear and pulley puller including a head, arms removably connected thereto, and means for holding said members removably connected, said means consisting of a resilient open ring, a frame adjustably mounted upon said arms.

5. A combined gear and pulley puller including a head, arms removably connected thereto, and means for holding said members removably connected, said means consisting of a resilient open ring, balls mounted in said arms for engagement with a pulley groove and means for forcing said balls from their mountings.

In testimony whereof I affix my signature.

F. J. HEINRICH.